United States Patent
Amafuji et al.

(10) Patent No.: US 8,188,937 B1
(45) Date of Patent: May 29, 2012

(54) BODY MOUNTING TYPE DISPLAY SYSTEM

(75) Inventors: Hisashi Amafuji, Kyoto (JP); Hidefumi Saito, Ibaraki (JP); Ryutaro Nasu, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 3253 days.

(21) Appl. No.: 09/644,797

(22) Filed: Aug. 24, 2000

(30) Foreign Application Priority Data

Sep. 6, 1999 (JP) .................................... 11-252301

(51) Int. Cl.
*G09G 5/00* (2006.01)
*G09G 5/08* (2006.01)
*G06F 3/033* (2006.01)
*G06F 3/02* (2006.01)

(52) U.S. Cl. ................. 345/8; 345/7; 345/156; 345/169
(58) Field of Classification Search .................. 345/7, 8, 345/9, 156, 157, 169, 700, 727, 728; 359/630
See application file for complete search history.

(56) References Cited

U.S. PATENT DOCUMENTS

| | | | | |
|---|---|---|---|---|
| 5,977,935 A * | 11/1999 | Yasukawa et al. | ................ | 345/8 |
| 6,046,712 A * | 4/2000 | Beller et al. | ..................... | 345/8 |
| 6,108,197 A * | 8/2000 | Janik | ............................ | 361/683 |
| 6,331,841 B1 * | 12/2001 | Tokuhashi et al. | ................ | 345/8 |
| 6,346,929 B1 * | 2/2002 | Fukushima et al. | ............... | 345/8 |
| 6,356,437 B1 * | 3/2002 | Mitchell et al. | ............... | 361/683 |
| 6,388,657 B1 * | 5/2002 | Natoli | .......................... | 345/168 |

\* cited by examiner

*Primary Examiner* — Srilakshmi K Kumar
(74) *Attorney, Agent, or Firm* — Manabu Kanesaka

(57) ABSTRACT

In a body mounting type display system, at least a signal corresponding to display data is outputted to a computer side output transmission circuit through a bus line of a computer, and the data corresponding to the signal is written in a buffer memory of the computer side output transmission circuit by the computer. The data written in the buffer memory is read and sent, and the data is received at a body side output transmission circuit, which is restored to a signal corresponding to the signal outputted through the bus line. An image output interface connected to the body side output transmission circuit produces a signal for actuating a display device worn by a user based on the display data of the restored signal. Thus, there is provided the body mounting type display system suitable for providing information to the user who can work with hand free condition.

5 Claims, 3 Drawing Sheets

BODY MOUNTING TYPE DISPLAY SYSTEM

BACKGROUND OF THE INVENTION AND RELATED ART STATEMENT

The invention relates to a body mounting type display system for providing information relative to a work to an operator in carrying out the work, which can not be carried out on a desk, for example, inspection, maintenance, repair or control for a large apparatus or equipment; medical treatment, such as operation; a serving action, such as reception, guidance or product explanation; or an operation of construction machinery, crane or factory equipment.

For example, when a work or operation, such as inspection, maintenance, repair or control, is carried out for a large apparatus or equipment, it has been studied to provide an operator or user with information of a maintenance manual which is inputted as electronic file by using a computer mounted on a body of the operator and a body mounting type display device mounted on a head of the operator. In this case, a signal output port exclusive for an image signal is provided to the computer, and the image signal is outputted to the body mounting type display device through a cable connected to the signal output port.

However, a spatial area where such type of work is carried out is often limited. Therefore, although it is necessary that the operator equipped with the display device can obtain information without using hands, it is not always necessary that the computer and batteries for actuating the computer are mounted on the body. Rather, it is important as a priority to provide mobility to the user by only providing the user with an interface with the user.

Therefore, for example, in a medical site, in order to carry out an operation while confirming images of a diagnostic equipment, such as X-ray CT and magnetic resonance imager (MRI), it has been tried that the images are displayed on a head mounting type display device mounted on a head of an operating doctor based on image signals taken out from an image signal output port provided to the diagnostic equipment. Also, in a construction site, in order to operate a construction machine, such as a crane, while confirming a picture image taken by a camera provided to the construction machine, it has been tried that the picture image is displayed on a head mounting type display device mounted on a head of an operator using image signals taken out from an image signal output port provided to a driver's seat of the construction machine.

Heretofore, since picture images have been displayed on a body mounting type display device by image signals outputted from a picture image source apart from a human body, a signal output port exclusive for the image signals is provided to the picture image source. Therefore, in case the body mounting type display system is formed of a computer, such as conventional computer, attached to a device where a signal output port exclusive for image signals is not provided, or a book-type computer considering the mobility, it is necessary to remodel the system in order to add the signal output port thereto. Also, there has been a case where such a remodeling is difficult. Thus, the body mounting type display system has not been applied to a wide field.

Also, in case a user equipped with the body mounting type display device carries out a work, normally, it is necessary for the user not only to confirm picture images but also to change picture images or select a necessary item from a menu by inputting data into a computer through a pointing device or a microphone. Also, there is a case wherein picture images at a working site taken by a camera mounted on the user are inputted into a computer, and then sent to a skilled operator away from that working site to ask for a guidance. In this case, it is necessary to provide interfaces for connecting input devices, such as a pointing device, microphone and camera, to a computer, and connect the computer and the input device through the interfaces by cables.

On the other hand, there is a case wherein information is provided to the user by sending output signals from the computer to an output device, such as a speaker or earphone mounted on the user. In this case, it is necessary to provide an interface for connecting an output device, such as speaker, to the computer, and connect the computer and the output device through the interface by a cable. In the above described cases, the number of wirings for connecting the computer and input-output devices mounted on the user's body is increased, and a number of wirings and thick wirings disturb the user in operation, so that the effect of free user's hands because of the body mounting type display device is decreased.

In view of the above problems, the present invention has been made, and an object of the invention is to provide a body mounting type display system for solving the above problems.

Further objects and advantages of the invention will be apparent from the following description of the invention.

SUMMARY OF THE INVENTION

A body mounting type display system of the present invention includes a display device to be mounted on a body of a user or operator, a computer for outputting signals corresponding to at least display data, and a signal transmission device disposed between the display device and the computer. The signal transmission device includes a computer side output transmission circuit connected to a bus line of the computer, and a body side output transmission circuit connected to the display device through an image output interface. The computer side output transmission circuit includes a buffer memory into which data corresponding to the signal outputted through the bus line is written by a central processing unit (hereinafter referred to as "CPU") of the computer, a device for reading out the data stored in the buffer memory and converting the data into a communication signal, and a device for sending or transmitting the communication signal. The body side output transmission circuit is formed of a device for receiving the communication signal sent from the computer side output transmission circuit, and a device for restoring the received communication signal to a signal equivalent to the signal outputted through the bus line. The image output interface produces a signal for actuating the display device based on the display data of the restored signal.

According to the structure of the present invention, signals corresponding to at least the display data are outputted to the computer side output transmission circuit through the bus line of the computer, and the data corresponding to the outputted signals is written in the buffer memory of the computer side output transmission circuit by the CPU of the computer. The data written in the buffer memory is read out to be converted into a communication signal, and sent to the body side output transmission circuit at a predetermined communication speed. The communication signals received in the body side output transmission circuit is restored to the signals outputted through the bus line. The image output interface of the display device connected to the body side output transmission circuit produces signals for actuating the display device based on the signals corresponding to the display data among the restored signals.

Thus, by using the computer equipped with the ordinary bus line without providing an exclusive signal output port for the image signals to the computer, the picture images corresponding to the display data outputted from the computer can be displayed on the display device mounted on the user.

Also, in case a conventional computer equipped with a display device interface is used as the computer of the present invention, by providing an address of a conventional display device interface to the buffer memory of the computer side output transmission circuit, the display device of the invention can be actuated according to the program employed in the conventional computer control, since there is no change in the address of the interface when viewed from the CPU of the computer.

The body mounting type display system according to the present invention may be further provided with an input device. The signal transmission device includes a computer side input transmission circuit connected to the bus line of the computer, and a body side input transmission circuit connected to the input device through an input interface. Input signals produced by the input device are converted into signals transmissible by the bus line of the computer through the input interface. The body side input transmission circuit includes a converting device for converting the signals transmitted from the input interface into communication signals, and a sending device for sending the communication signals. The computer side input transmission circuit includes a receiving device for receiving the communication signals sent from the body side input transmission circuit, a restoring device for restoring the received communication signals to signals corresponding to the signals transmitted from the input interface, and a buffer memory into which the input data corresponding to the restored signals is written. The input data stored in the buffer memory can be read out by the CPU of the computer through the bus line.

The input signals produced by the input device are converted into signals transmissible by the bus line of the computer through the input interface, converted into communication signals by the body side input transmission circuit, and sent to the computer side input transmission circuit. The communication signals received by the computer side input transmission circuit are restored to the signals transmitted from the input interface, and input data corresponding to the restored signals is written in the buffer memory. The input data stored in the buffer memory is read out by the computer through the bus line.

Thus, in case the operator or user equipped with the body mounting type display device works, the operator not only confirms the picture images but also inputs by oneself data into the computer through the input device. Moreover, it is not necessary to directly connect the input device to the computer, and it is enough to connect the computer side output transmission circuit and the computer side input transmission circuit to the bus line of the computer, the image output interface of the display device to the body side output transmission circuit, and the input interface of the input device to the body side input transmission circuit.

Thus, wirings required when the communication signals are sent by wire are limited to a wiring between the computer side output transmission circuit and the body side output transmission circuit, and a wiring between the computer side input transmission circuit and the body side input transmission circuit to thereby not require thick wirings and a number of wirings. Also, in case the communication signals are sent by radio transmission, no wiring is required to thereby not disturb the operator equipped with the body mounting type display device.

Also, in case a conventional computer including a display device interface and an input device interface is employed as the computer of the present invention, by providing an address of the conventional display device interface to the buffer memory of the computer side output transmission circuit and an address of the conventional input device interface to the buffer memory of the computer side input transmission circuit, the display device and input device of the present invention can be actuated by a program used for controlling the conventional computer, since there is no change in the addresses of the respective interfaces when viewed from the CPU of the computer.

It is preferable that an output device to be worn or mounted to the operator, different from the display device, may be connected to the body side output transmission circuit through an output interface. The computer can output signals corresponding to an output content of the output device as signals outputted through the bus line, and the output interface produces signals for actuating the output device based on the signals corresponding to the output content among signals restored by the body side output transmission circuit.

Thus, the signals corresponding to the output content of the output device are outputted to the computer side output transmission circuit through the bus line of the computer, and data corresponding to the outputted signals is written in the buffer memory of the computer side output transmission circuit by the computer. The data written in the buffer memory is read out to be converted into the communication signal, and sent to the body side output transmission circuit at a predetermined communication speed. The communication signals received at the body side output transmission circuit are converted into signals outputted through the bus line, i.e. signals containing the same signals as that obtained by directly reading the content through the bus line. An output interface of the output device connected to the body side output transmission circuit produces signals for actuating the output device based on signals corresponding to the output content among the restored signals.

Thus, in case of work using the body mounting type display device, the operator not only confirms picture images, but also is provided with information through the output device. Moreover, there is no necessity for directly connecting the output device to the computer, and it is merely enough to connect the output interface of the output device to the body side output transmission circuit.

Also, in case a conventional computer including a display device interface and input-output device interfaces is used as the computer of the present invention, by providing addresses of the conventional display device interface and the output device interface to the buffer memory of the computer side output transmission circuit and the conventional input device interface to the buffer memory of the computer side input transmission circuit, the display device and input device of the present invention can be actuated by a program used for controlling the conventional computer, since there is no change in the addresses of the respective interfaces when viewed from the CPU of the computer.

It is preferable that the communication signals are transmitted from a sending side to a receiving side by radio transmission. Through transmission of the communication signals from the sending side to the receiving side by the radio transmission, wirings among the display device, input-output devices and computer can be removed to thereby prevent the operator equipped with the display device from being disturbed by the wirings.

DETAILED DESCRIPTION OF PREFERRED EMBODIMENTS

With reference to the accompanying drawings, embodiments according to the present invention will be explained hereunder.

Figure 1:
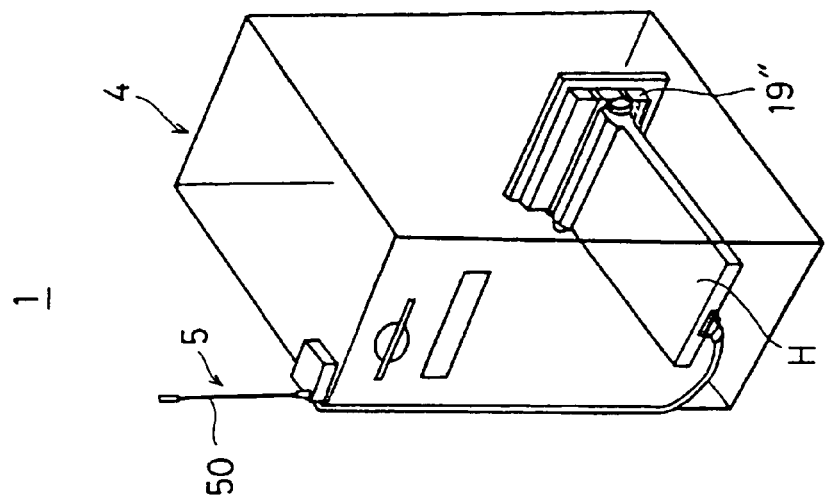
FIG. 1 is a perspective view of a body mounting type display system of an embodiment according to the present invention.
Figure 1:
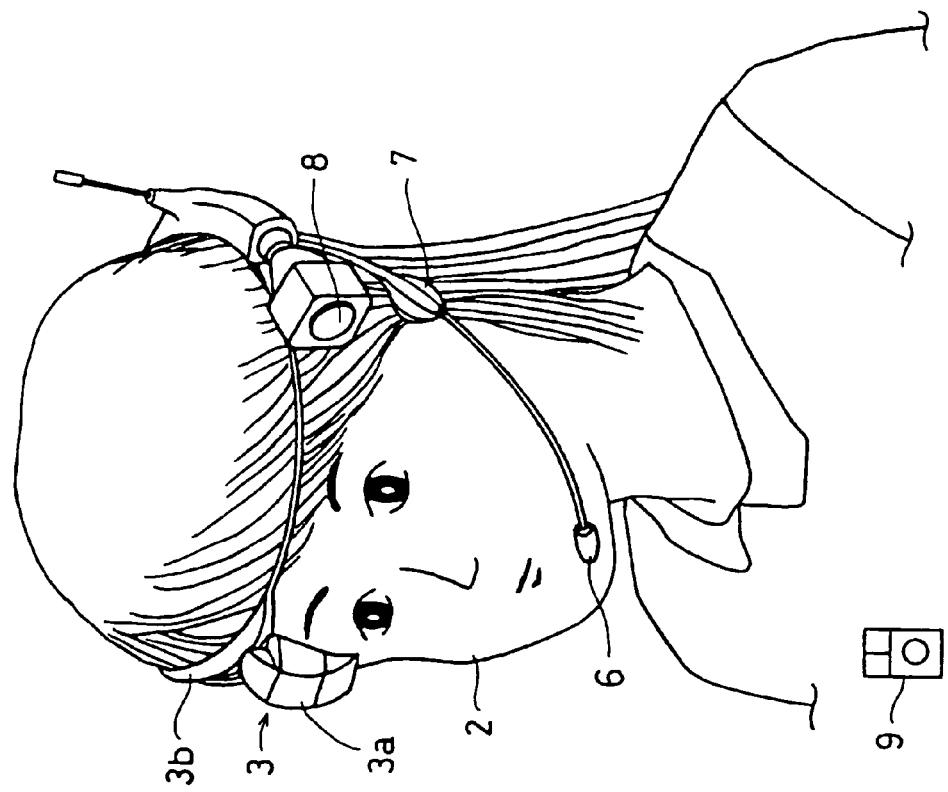

A body mounting type display system 1 as shown in FIG. 1 includes a head mounting type display device (HMD) 3 to be mounted on a head of an operator or user 2; a computer 4 disposed away from the operator 2; a signal transmission device 5 disposed between the head mounting type display device 3 and the computer 4; a microphone (input device) 6, a speaker or earphone (output device) 7 and a camera (input device) 8, which are mounted on or worn by the operator 2 through attachment to the head mounting type display device 3; and a mouse (input device) 9 operated by the operator 2. The mouse 9 may be held by a hand of the operator 2, or attached to the body, such as an arm, of the operator 2 through a band.

Figure 2:
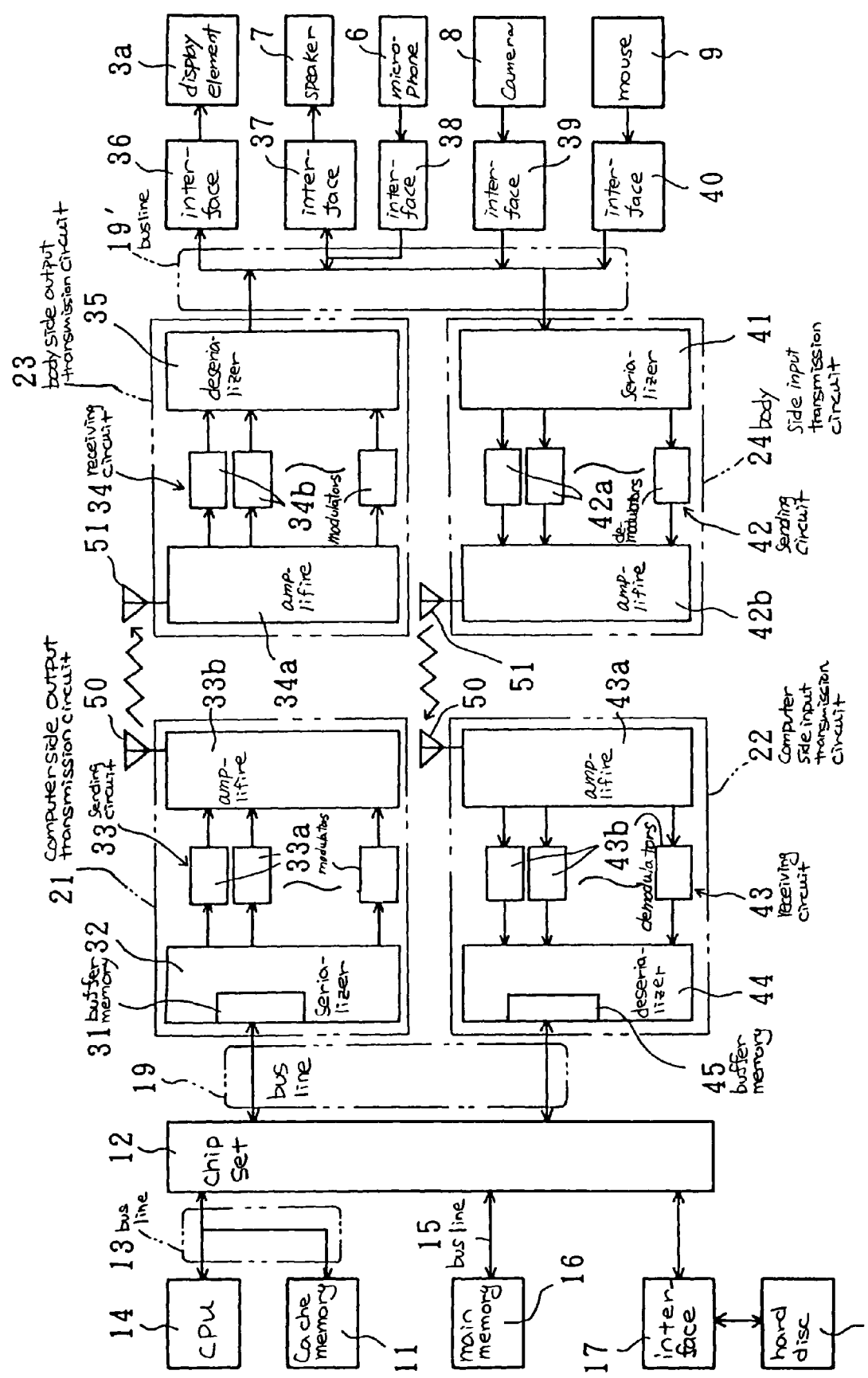
FIG. 2 is an explanatory drawing of a structure of the body mounting type display system of a first embodiment.

As shown in FIG. 2, the computer 4 includes a CPU 14 connected to a cache memory 11 and a chip set 12 through a bus line 13. The chip set 12 is connected to a main memory 16 through a bus line 15, and a hard disc 18 is connected to the chip set 12 through a hard disc interface 17. In the computer 4, the CPU 14 carries out a process according to an execution command and data stored in the main memory 16 and the hard disc 18, so that signals corresponding to display data by the head mounting type display device 3 and signals corresponding to contents of a sound output of the speaker 7 are outputted.

The signal transmission device 5 includes a computer side output transmission circuit 21, a computer side input transmission circuit 22, a body side output transmission circuit 23, and a body side input transmission circuit 24.

As shown in FIG. 1, the computer side output transmission circuit 21 and the computer side input transmission circuit 22 are disposed on a common base plate as a host circuit unit H, and are connected to a bus line 19 of the computer 4 through a bus line connector 19". The bus line 19 is formed of several bus lines for data, address and controlling purposes. In the present embodiment, the bus line 19 is an Industry Standard Architecture (hereinafter referred to as "ISA") bus. The computer side output transmission circuit 21 and the computer side input transmission circuit 22 are detachably connected through the connector to the bus line which meets such a widely applied bus standard as the ISA bus, so that the body mounting type display system 1 of the invention can be easily incorporated into almost all the existing systems.

The body side output transmission circuit 23 and the body side input transmission circuit 24 are mounted on a head portion of the operator 2 as a slave circuit unit S through the head mounting type display device 3. The body side output transmission circuit 23 is connected to the head mounting type display device 3 through an image output interface 36, and the speaker 7 through a sound output interface 37. The body side input transmission circuit 24 is connected to the microphone 6 through a sound input interface 38, the camera 8 through an image input interface 39, and the mouse 9 through a mouse input interface 40. The respective interfaces 36, 37, 38, 39, 40 are mounted on the head portion of the operator 2 through the head mounting type display device 3 by housing them in a casing of the slave circuit unit S. The respective interfaces 36, 37, 38, 39, 40 are connected to the slave circuit unit S through a bus line 19' having the same operation and function as those of the ISA bus standard, same as the bus line 19 of the computer 4.

The computer side output transmission circuit 21 includes a buffer memory 31, a serializer 32 and a transmitting or sending circuit 33.

Signals corresponding to display data of the head mounting type display device 3 outputted through the bus line 19 of the computer 4 and data corresponding to signals corresponding to the contents of the sound output of the speaker 7 are written in the buffer memory 31 by the CPU 14 through the chip set 12.

The serializer 32 reads out the data stored in the buffer memory 31 and converts it to communication signals. In the present embodiment, the data read out from the buffer memory 31 by the serializer 32 is converted into high speed serial signals to thereby obtain a necessary transmitting speed.

The sending circuit 33 modulates serial communication signals of plural channels outputted from the serializer 32 by modulators 33a. At this time, frequencies of the serial communication signals of the respective channels are made different form each other at a predetermined frequency interval, so that the frequency for one channel is assigned to each of the serial communication signals of the respective channels. The modulated waves of the channels are mixed and amplified at an amplifier 33b, converted to electromagnetic waves, and sent by a radio transmission through a host antenna 50.

The body side output transmission circuit 23 includes a receiving circuit 34 and a deserializer 35.

The receiving circuit 34 receives the communication signal sent from the computer side output transmission circuit 21. More specifically, in the receiving circuit 34, after the electromagnetic waves received by a slave antenna 51 are amplified at an amplifier 34a, the signals are demodulated for the respective channels of the original serial communication signals at demodulators 34b, and are sent to the deserializer 35.

In the deserializer 35, the received communication signals are restored to the parallel data signals with the original bus width outputted through the bus line 19 of the computer 4. The restored signals are sent to the respective interfaces 36, 37, 38, 39, 40.

As shown in FIG. 1, the head mounting type display device 3 includes a display element 3a for emitting a picture image display light led to eyes of the operator 2, and a mounting portion 3b, such as a head set, for mounting the display element 3a to the head of the operator 2. The display element 3a is, for example, formed of a liquid-crystal display element with a back-light. Incidentally, as the head mounting type display device, for example, there may be employed a display device wherein the picture image display lights emitted from the display elements are led to the eyes of the operator 2 by optical elements, such as an all reflecting mirror or a combination, e.g. a half mirror and a hologram element and the like. Or, a display device mounted on a portion other than the head may be employed instead of the head mounting type display device.

The image output interface 36 produces signals for operating the display element 3a of the head mounting type display device 3 based on signals corresponding to the display data among the signals restored by the deserializer 35 of the body side output transmission circuit 23. Thus, a picture image corresponding to the display data can be observed by the operator 2. Also, the sound output interface 37 produces signals for actuating the speaker 7 based on signals corresponding to the sound output contents among the signals restored by the deserializer 35 of the body side output transmission circuit 23. Thus, a sound corresponding to the sound output contents can be heard by the operator 2.

Sound input signals produced by the sound input interface 38 through the microphone 6 are converted into signals transmittable by the bus line 19 of the computer 4; image input signals produced by the image input interface 39 through the camera 8 are converted into signals transmittable by the bus line 19 of the computer 4; and input signals produced by the mouse input interface 40 through the mouse 9 are converted into signals transmittable by the bus line 19 of the computer 4.

The body side input transmission circuit 24 includes a serializer 41 and a transmitting or sending circuit 42.

The serializer 41 converts the signals transmitted from the respective interfaces 38, 39, 40 into communication signals. In the present embodiment, the data transmitted from the respective interfaces 38, 39, 40 by the serializer 41 is converted into high speed serial signals to thereby obtain a necessary transmission speed.

In the sending circuit 42, serial communication signals of plural channels outputted from the serializer 41 are modulated by modulators 42a. At this time, the frequencies of the serial communication signals of the respective channels are made different from each other at a predetermined frequency interval, so that a frequency for one channel is assigned to each of the serial communication signals of the respective channels. The modulated waves of the channels are mixed and amplified at an amplifier 42b, and are converted into electromagnetic waves through the slave antenna 51, which are sent by radio transmission.

When a communication through the radio transmission is carried out by the signal transmission device 5, it is preferable to use electromagnetic waves in a frequency band more than 800 MHz in order to obtain a required communication speed. For example, in case a frequency in a band width of 2.4 GHz is used, a channel is provided in every 1 MHz, so that total 79 channels from 2.402 GHz to 2.480 GHz can be used. In case the bus line 19 of the computer 4 is the ISA bus, suitable 12 channels can be selected among them. Also, in this case, assuming that a transmitting distance is in the order of 10 meters, generally, a transmitting electric power of about 100 mW is required. Thus, the electric power consumed by the transmission through the radio transmission is equal to or less than that by a portable telephone. Accordingly, a power supply capacity required at the body mounting side is extremely small when compared with a power supply capacity required for operating the CPU and its peripheral circuits, so that it is possible to incorporate a small battery into the head set or the like.

The computer side input transmission circuit 22 includes a receiving circuit 43, deserializer 44 and buffer memory 45.

The receiving circuit 43 receives communication signals sent from the body side input transmission circuit 24. More specifically, in the receiving circuit 43, the electromagnetic waves received by the host antenna 50 are amplified at an amplifier 43a, and after the waves are demodulated for the respective channels of the original serial communication signals at the demodulators 43b, the signals are sent to the deserializer 44.

In the deserializer 44, the received communication signals are restored to parallel data signals having the original bus width transmitted from the input interfaces 38, 39, 40. Input data corresponding to the restored signals transmitted from the input interfaces 38, 39, 40 is written in the buffer memory 45. The input data stored in the buffer memory 45 can be read out by the CPU 14 of the computer 4.

Figure 3:
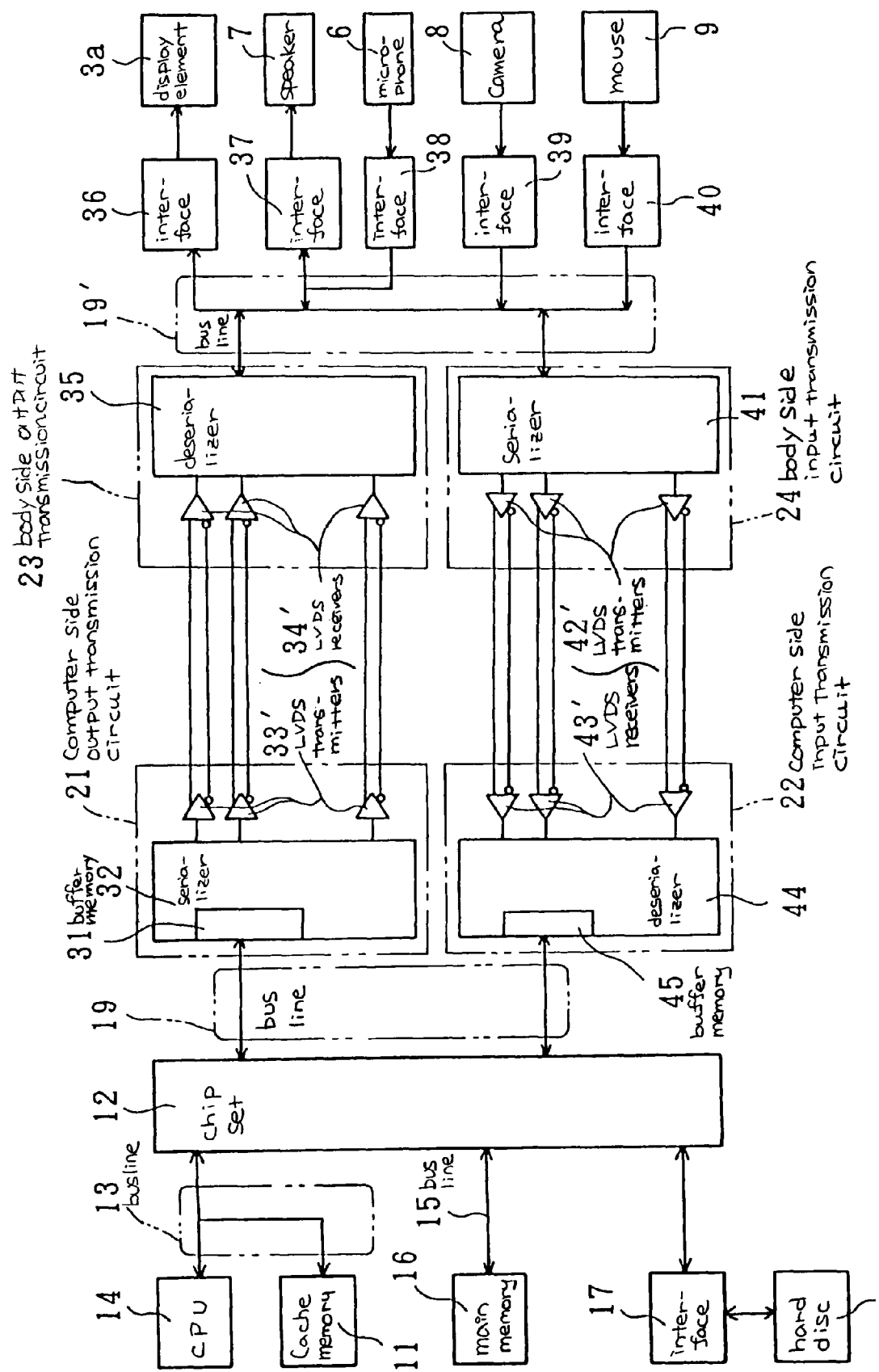
FIG. 3 is an explanatory drawing of a structure of the body mounting type display system of a second embodiment of the invention.

FIG. 3 shows a second embodiment of the present invention. A difference of the second embodiment from the first embodiment resides in that a low voltage differential signaling (hereinafter referred to as "LVDS") system has been employed as a transmitting device of the communication signal. More specifically, instead of the sending circuit 33 of the computer side output transmission circuit 21 and the sending circuit 42 of the body side input transmission circuit 24 of the first embodiment, in the second embodiment, LVDS transmitters 33', 42' have been used, and instead of the receiving circuit 34 of the body side output transmission circuit 23 and the receiving circuit 43 of the computer side input transmission circuit 22 of the first embodiment, LVDS receivers 34', 43' have been employed. The serial communication signals are converted to differential signals with a small voltage amplitude by the LVDS transmitters 33', 42' and sent to the LVDS receivers 34', 43' by cables.

For example, in the ISA bus, basically, a system address bus of 20 bits, an address bus of 7 bits to be used together with a control bus and a system data bus of 16 bits are operated by a basic clock of 8.3 MHz. In case information of a total of 43 bits outputted through these buses is serially transmitted through a serializer of 10 bits to 1 bit and a deserializer of 1 bit to 10 bits, signal lines of a total of 10 channels, i.e. 5 channels for receiving signals and 5 channels for sending signals, are required.

The other portions of the second embodiment are the same as those of the first embodiment, and the same components or portions are designated by the same symbols.

According to the above structure, signals corresponding to the display data and sound output contents are outputted to the computer side output transmission circuit 21 through the bus line 19 of the computer 4, and the data corresponding to the outputted signals are written in the buffer memory 31 by the CPU 14. The data written in the buffer memory 31 are read out and converted into communication signals, which are sent out, and the sent-out communication signals are received by the body side output transmission circuit 23 and restored to the signals corresponding to those outputted through the bus line 19. The image output interface 36 produces signals for actuating the head mounting type display device 3 based on the signals corresponding to the display data among the restored signals, and the sound output interface 37 produces signals for actuating the speaker 7 based on the signals corresponding to the sound output contents among the restored signals.

Thus, it is possible to display, by the head mounting type display device 3, a picture image corresponding to the display data outputted from the computer 4 by using the computer 4 equipped with the general bus line 19 without providing a signal output port exclusive for the image signal to the computer 4. Also, it is possible to output information to the operator 2 by using the speaker 7. Moreover, it is not required to directly connect the speaker 7 to the computer 4, and the sound output interface 37 is simply connected to the body side output transmission circuit 23.

Also, according to the above structure, the input signals produced by the microphone 6, camera 8 and mouse 9 are converted to transmittable signals by the bus line 19 of the computer 4 with the input interfaces 38, 39, 40, and then converted to the communication signals by the body side input transmission circuit 24, which are sent. The communication signals received by the computer side input transmission circuit 22 are restored to the signals transmitted from the input interfaces 38, 39, 40. Input data corresponding to the restored signals is written in the buffer memory 45. The input data stored in the buffer memory 45 is read out by the computer 4.

Thus, in case the operator 2 equipped with the head mounting type display device 3 works, the user not only confirms the picture image but also inputs into the computer 4 by using the input devices 6, 8, 9. Moreover, it is not required to directly connect the input devices 6, 8, 9 to the computer 4. Only the computer side output transmission circuit 21 and the computer side input transmission circuit 22 are connected to the bus line of the computer 4, the image output interface 36 is connected to the body side output transmission circuit 23, and the input interfaces 38, 39, 40 are connected to the body side input transmission circuit 24. Therefore, wirings required when the communication signals are sent through wires are wirings provided between the computer side output transmission circuit 21 and the body side output transmission circuit 23 and wirings provided between the computer side input transmission circuit 22 and the body side input transmission circuit 24, so that thick wirings and many other wirings are not required. Also, in case the communication signals are sent through radio transmission, these wirings are not required.

Further, by transmitting the communication signals from a sending side to a receiving side through the radio transmission, wirings among the display device, the input-output devices and the computer can be removed to thereby prevent the operator equipped with the display device from being disturbed by the wirings.

Incidentally, in case a conventional computer equipped with a display device interface and input-output device interfaces is used as the computer 4 in the above embodiments, when the addresses of the conventional display device interface and the output device interface are provided to the buffer memory 31 of the computer side output transmission circuit 21, and the address of the conventional input device interface is provided to the buffer memory 45 of the computer side input transmission circuit 22, there is no change in the addresses of the respective interfaces from the view of the CPU 14. Thus, the head mounting type display device 3 and input-output devices 6, 7, 8, 9 can be actuated by a program used for controlling the conventional computer.

The present invention is not limited to the above embodiments. For example, the signals restored to the signals outputted through the bus line from the computer at the body side output transmission circuit are not limited to the signals transmitted to the output interface as outputted through the bus line, and may be transmitted as serial signals. Also, the input device and the output device are not limited to special ones, and may be a pointing device and a pad-shape keyboard other than the mouse. Also, the interfaces of the head mounting type display device, microphone, camera, pointing device, key pad, earphone and the like may be miniaturized and made light in weight by subjecting them to an application specific integrated circuit (ASIC). Further, instead of the input-output devices, such as the pointing device and pad-shape keyboard, to be used at positions away from the head mounting type display device, the input-output devices, such as the head mounting type display device, microphone, earphone and camera, the interfaces for the input-output devices and the body side input-output transmission circuits may be incorporated into structural portions of the head set for mounting the head mounting type display device to a head, and the communication signals may be transmitted by a radio transmission system, so that cables do not appear outside.

According to the present invention, there is provided a body mounting type display system suitable for providing information from a computer to an operator or user who can work with free hands to thereby contribute to practical use in a wide field.

While the invention has been explained with reference to the specific embodiments of the invention, the explanation is illustrative and the invention is limited only by the appended claims.

What is claimed is:

1. A body mounting display system, comprising:
    a display device to be worn by a user and having at least one interface;
    a computer situated away from the display device and having a bus line for outputting signals corresponding to at least display data, said computer transmitting a plurality of different kinds of signals; and
    a radio transmission device disposed between the display device and the computer, and including a computer side output transmission circuit connected to the computer through the bus line, and a body side output transmission circuit,
    wherein the body side output transmission circuit is adapted to be worn by the user and is connected to the display device through the at least one interface, and the signals at the computer passing through the bus line are transmitted wirelessly from the computer side output transmission circuit to the body side output transmission circuit and are restored at a user side to be displayed at the display device through the at least one interface without processing;
    said computer side output transmission circuit includes a first buffer memory to which data corresponding to the signals is written by the computer, a first reading device for reading data stored in the first buffer memory and converting the data to communication signals, and a first sending device for sending the communication signals; said body side output transmission circuit includes a first receiving device for receiving the communication signals sent from the computer side output transmission circuit, and a first restoring device for restoring the received communication signals to restored signals corresponding to the signals outputted from the computer without further processing the signals; and
    said at least one interface includes an image output interface connected to the first restoring device and the display device for producing the signals for actuating the display device based on the restored signals outputted from the first restoring device.

2. A body mounting display system, comprising:
    a display device to be worn by a user,
    an image output interface to be worn by the user and connected to the display device,
    a computer located away from the display device for outputting signals corresponding to display data for the display device and having a bus line, said computer transmitting a plurality of different kinds of signals, and
    a signal transmission device disposed between the display device and the computer, and including a computer side output transmission circuit connected to the computer through the bus line and a body side output transmission circuit to be worn by the user and connected to the display device through the image output interface, said body side output transmission circuit being connected to the computer side output transmission circuit wirelessly,
    wherein said computer side output transmission circuit includes a first buffer memory to which data corresponding to the signals outputted through the bus line is written by the computer, a first reading device for reading the data stored in the first buffer memory and converting the data to communication signals and a first sending device for sending the communication signals, said body side output transmission circuit includes a first receiving device for receiving the communication signals sent from the first sending device as they are and a first restoring device for restoring the received communication signals to signals corresponding to the signals outputted through the bus line, and said signals of the computer wirelessly transferred to the body side output transmission circuit are only restored at the body side without processing to obtain each kind of signals at a user side, said image output interface processing and producing signals at the user side for actuating the display device based on the communication signals.

3. A body mounting display system, comprising:
a display device to be worn by a user,
an image output interface connected to the display device,
a computer located away from the display device for outputting a signal corresponding to display data for the display device and having a bus line;
a signal transmission device disposed between the display device and the computer, and including a computer side output transmission circuit connected to the computer through the bus line and a body side output transmission circuit connected to the display device through the image output interface, said computer side output transmission circuit having a first buffer memory to which data corresponding to the signal outputted through the bus line is written by the computer, a first reading device for reading the data stored in the first buffer memory and converting the data to a communication signal and a first sending device for sending the communication signal, said body side output transmission circuit including a first receiving device for receiving the communication signal sent from the first sending device and a first restoring device for restoring the received communication signal to a signal corresponding to the signal outputted through the bus line, said image output interface producing a signal for actuating the display device based on the communication signal,
an input device held by the user, and
an input interface connected to the input device, an input signal produced by the input device being converted to a signal transmissible by the bus line of the computer through the input interface,
wherein said signal transmission device includes a computer side input transmission circuit connected to the bus line of the computer, and a body side input transmission circuit connected to the input device through the input interface, said body side input transmission circuit having a second converting device for converting a signal transmitted from the input interface to a communication signal and a second sending device for sending the communication signal, said computer side input transmission circuit having a second receiving device for receiving the communication signal sent from the second sending device, a second restoring device for restoring the received communication signal to a signal corresponding to the signal transmitted from the input interface, and a second buffer memory for storing as input data the signal from the second restoring device, said input data stored in the buffer memory being read by the computer through the bus line.

4. A body mounting display system according to claim 3, further comprising: an output device different from the display device and worn by the user, and an output interface for connecting the output device to the body side output transmission circuit, said computer outputting a signal corresponding to an output content of the output device through the bus line, said output interface producing a signal for actuating the output device based on the signal corresponding to the output content among signals restored by the body side output transmission circuit.

5. A body mounting display system according to claim 3, wherein said communication signal is transmitted from a sending side to a receiving side by radio transmission.

* * * * *